United States Patent
Fung et al.

(10) Patent No.: US 7,237,009 B1
(45) Date of Patent: Jun. 26, 2007

(54) METHODS, SYSTEMS AND DATA STRUCTURES FOR ASSIGNING CATEGORIES TO ELECTRONIC MAIL

(75) Inventors: Kenny Chunwai Fung, Orem, UT (US); Brian Verle Allred, Mapleton, UT (US); Scott M. Clayton, Spanish Fork, UT (US); Robert Scott Goodman, Orem, UT (US)

(73) Assignee: Novell, Inc., Provo, UT (US)

( * ) Notice: Subject to any disclaimer, the term of this patent is extended or adjusted under 35 U.S.C. 154(b) by 727 days.

(21) Appl. No.: 10/171,218

(22) Filed: Jun. 12, 2002

(51) Int. Cl.
*G06F 3/00* (2006.01)

(52) U.S. Cl. .................... 709/206; 709/207; 715/752

(58) Field of Classification Search ........ 709/206–207, 709/224; 707/7
See application file for complete search history.

(56) References Cited

U.S. PATENT DOCUMENTS

| | | | |
|---|---|---|---|
| 5,765,170 A * | 6/1998 | Morikawa | 707/1 |
| 5,875,302 A | 2/1999 | Obhan | |
| 5,905,863 A | 5/1999 | Knowles et al. | |
| 5,948,058 A | 9/1999 | Kudoh et al. | 709/206 |
| 6,088,696 A | 7/2000 | Moon et al. | 707/10 |
| 6,134,582 A | 10/2000 | Kennedy | 709/206 |
| 6,330,589 B1 | 12/2001 | Kennedy | 709/206 |
| 6,393,423 B1 * | 5/2002 | Goedken | 707/10 |
| 6,678,705 B1 * | 1/2004 | Berchtold et al. | 707/204 |
| 6,725,228 B1 * | 4/2004 | Clark et al. | 707/7 |
| 2002/0120600 A1* | 8/2002 | Schiavone et al. | 707/1 |
| 2002/0163538 A1* | 11/2002 | Shteyn | 345/752 |
| 2002/0178229 A1* | 11/2002 | Sinha et al. | 709/206 |

FOREIGN PATENT DOCUMENTS

| | | |
|---|---|---|
| EP | 0 420 779 A2 * | 4/1991 |
| EP | 1 199 854 A2 * | 4/2002 |
| WO | WO 99/64972 A2 * | 12/1999 |

* cited by examiner

*Primary Examiner*—Patrice L. Winder
(74) *Attorney, Agent, or Firm*—Schwegman, Lundberg, Woessner & Kluth P.A.

(57) ABSTRACT

Methods, systems, and data structures are provided for assigning categories to electronic mail (email). An email includes a category identification field, a sender category identification field, and a receiver category identification field. When the email is transmitted any sender assigned category identification being made by the sender is placed in the sender category identification field, and any previous value contained in the sender category identification field is moved to the category identification field and the receiver category identification field. In some embodiments, the sender category identification field and the receiver category identification field can include distribution lists associated with multiple senders and multiple receivers of the email. When the email is received any value included in the category identification field is presented with the email.

26 Claims, 4 Drawing Sheets

METHODS, SYSTEMS AND DATA STRUCTURES FOR ASSIGNING CATEGORIES TO ELECTRONIC MAIL

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright ® 2002, Novell, Inc., All Rights Reserved.

FIELD OF THE INVENTION

The present invention relates to assigning categories to electronic mail (email), and in particular to methods, systems, and data structures used to customize and retain categories associated with emails.

BACKGROUND OF THE INVENTION

Email is rapidly becoming the preferred form of communication for businesses, governments, and personal communications of individuals. As a result, a variety of tools have been provided by email systems to filter, customize, process, and present emails within the email systems in order to improve an end-user's experience and productivity within the email systems. Further, email systems have become collaborative with a variety of other applications that the end-user may use while accessing an email within the email systems. For example, emails are often integrated with calendar applications, word processing applications, image viewing applications, World Wide Web (WWW) browser applications, spreadsheet applications, database applications, and others.

Moreover, email systems typically are packaged with macro coding languages that permit the end-user to define rules that execute upon the receipt of an email to perform some processing against the received email. For example, rules can send a response to a sender of the received email indicating that the recipient of the email is unavailable, rules can forward the email to a second email address, and rules can automatically move the received email to end-user defined email folders.

Also, email systems present emails included within an end-user's email inbox in a variety of formats. Some formats can be configured based on the preferences of the end-user, and a number of the formats come predefined with the email system. For example, often emails presented within an end-user's email inbox are displayed in a summary format, where metadata information associated with each email is listed horizontally across a window for the end-user to easily view. Some of this metadata information can include an indication as to whether the email has any electronic attachments, an indication as to whether any priority is associated with the email, an indication as to a date the email was received, an indication of an email address that sent the email, and a textual description of a subject associated with the email.

However, even with the variety of applications and tools provided with conventional email systems, many end-users still find the ability to customize email communications according to their own individual preferences difficult. Also, many end-users find it difficult to globally customize email communications. For example, some end-users can receive large volumes of emails on any given day, and since it is difficult to customize the email communications the end-users become frustrated and often ignore email communications that are of importance to the end-users because of the end-users inability to rapidly and efficiently distinguish between the important emails and insignificant emails.

Furthermore, a single email can be communicated from and to a particular end-user on multiple occasions. For example, an end-user can originate an email and then later receive the same email back, such as when a recipient of the end-user's original email replies to the original email. As is readily apparent to one of ordinary skill in the art, the transfer of the original email from and to the end-user can potentially have an infinite number of iterations involving a plurality of recipients. In order for the end-user and each of the recipients of the email to efficiently process iterations of the transferred email, the end-user and the recipients need the capability to independently customize the way in which the end-user and each of the recipients prefer to identify and process the transferred email, or the ability to globally coordinate identification and processing of the transferred email.

One conventional technique permits customized categories to be assigned by conventional email systems for each recipient of the email. However, the customized categories are not consistently maintained with the email itself, and as a result when one recipient receives the same email transferred back from a sender, the recipient must manually identify the email and manually assign the same customized category to the email that the recipient original assigned to the email. This can be frustrating to the recipient, and defeats the purpose of being able to automatically assign a category to a single email with the assurance that the email system will maintain that association irrespective of the number of iterations that each recipient receives the email.

As is now apparent to one of ordinary skill in the art, conventional email systems do not permit a customized assignment of categories to an email, such that the categories can be tailored to each recipient of the email. Furthermore, conventional email systems do not maintain consistent categories with transferred iterations of a single email.

Therefore, there exists a need for improved techniques that customize category assignments for each recipient of an email. Moreover, there exists a need for techniques that maintain the customized category assignment for all transferred iterations of the email.

SUMMARY OF THE INVENTION

In various embodiments of the present invention, techniques for assigning and associating categories with electronic mail (mail) are described. Emails include sender and receiver defined categories. When a receiver receives the email, any previously associated category made by the receiver becomes visible and usable by the receiver to assist in filtering and identifying the email.

More specifically and in one embodiment of the present invention, a method for assigning email is presented. A sender category identification is associated with the email, as assigned by an original sender of the email. Moreover, the sender category identification is maintained as the email is transferred between the original sender and an original receiver. The original sender has access to the sender category identification when the email is transferred back to the original sender from the original receiver.

In another embodiment of the present invention, another method for assigning email categories is provided. Category identifications are received from recipients and senders of the email. Furthermore, a distinctive category identification selected from the category identifications is maintained for each recipient and sender included within the recipients and senders. Additionally, the distinctive category identification is presented with the email, when a recipient receives the email.

In still another embodiment of the present invention, an email category assigning system is presented. The email category assigning system includes an email and a plurality of category identifications. Further, the email is associated with the plurality of category identifications. Each category identification is uniquely associated with a different recipient of the email, if an assigned category identification was previously designated by one of the recipients.

In yet another embodiment of the present invention, an email data structure residing on a computer readable medium associated with categories is described. The email data structure includes a sender category identification field and a receiver category identification field. Moreover, when a sender assigns a sender category identification value to the email, the sender category identification is placed in the sender category identification field and any previous receiver category identification value contained in the sender category identification field is moved to the receiver category identification field before the email is sent by the sender to a receiver.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
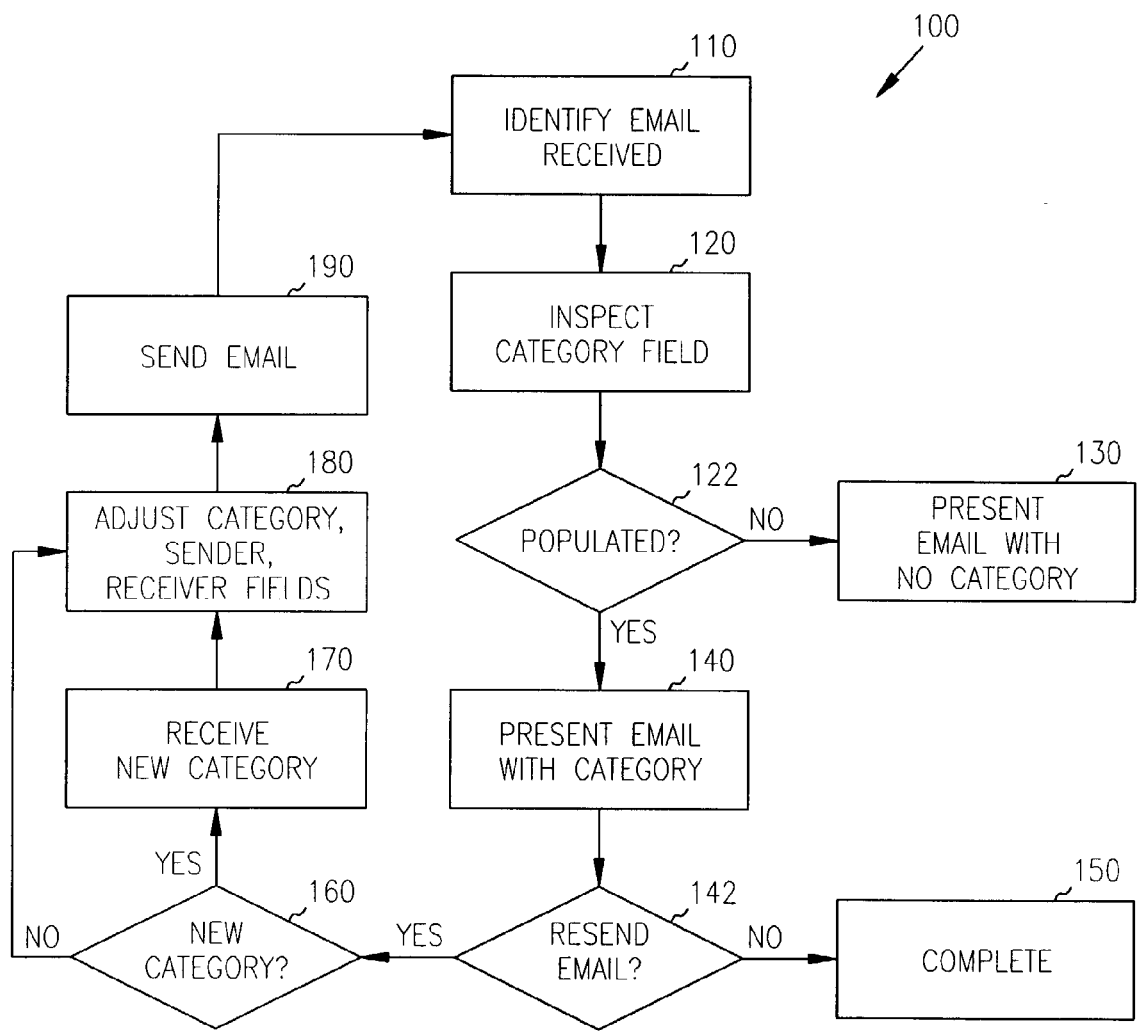
FIG. 1 is a flowchart representing a method for assigning categories to an email, according to the teachings of the present invention.

In the following description, reference is made to the accompanying drawings that form a part hereof, and in which is shown by way of illustration specific embodiments in which the invention may be practiced. These embodiments are described in sufficient detail to enable one of ordinary skill in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

As used herein an "email" refers to an electronic communication or message transferred within one or more email systems. Once an email is created, the email maintains metadata information associated with senders, receivers, and categories, notwithstanding the number of modifications made to the email as the email is transferred from senders and receivers of the email. Moreover, a single end-user can carry the designation of a sender or a receiver of the email as it is transferred through multiple iterations within the email system. And, a receiver can also be coined a recipient according to various embodiments of the present disclosure. For example, when the email is created the end-user associated with creating the email is referred to as a sender, and the one or more end-users that receive the email sent by the original sender are referred to as receivers or recipients. Yet, when a receiver replies or forwards the email back to the original sender, the receiver becomes a sender, and the original sender becomes a receiver or recipient. In this way, depending upon the action being taken by end-users with the email, the designation of sender and receiver can change for the end-users.

"Category identification" refers to a unique identification that can be associated with a particular end-user defined category. The category identification can be a number string, an alphabetic string, or a string that includes a unique sequence of any electronic character (e.g., numeric, symbolic, alphabetic, punctuation, and others). Category identifications need not be unique across end-users, but are unique for any particular end-user. A single end-user can have multiple unique category identifications for a single email. Category identifications can be used to access data stores to acquire descriptive and meaningful text, icons, links, images, and the like. End-users can customize, design, and organize categories in one-dimension formats or in hierarchical, multidimensional formats. Moreover, in various embodiments of the present invention a number of categories and corresponding category identifications can come prepackaged within an email system using the teachings of the present disclosure. Additionally, in some embodiments of the present disclosure, a category identification can be globally accessible and usable by all senders and recipients.

Furthermore, in one embodiment, the present disclosure is implemented using a GroupWise email system, distributed by Novell, Inc. of Provo, Utah. Of course any email system or email using the teachings of the present invention can be used without departing from the present disclosure, and all such email systems and emails are intended to fall within the scope of the present invention.

FIG. 1 illustrates a flowchart representing a method 100 for assigning categories to an email, according to the teachings of the present invention. In 110, an email system receives an email. If an original sender is creating the email, then the email system receives the email as a template where the original sender can assign and populate the email with a variety of information. Some of this information will include an address of an email receiver, and in some cases the address of the email receiver is actually a plurality of email addresses associated with an email distribution list, or a manual list of email receivers.

In 120, a category identification field associated with the metadata of the email is inspected for a value. Metadata includes information about the email, such as the addresses of the email receivers, the date the email was created, the address of the original sender of the email, and the like. A category identification value is a unique string that is assigned by the original sender, or alternatively by a subsequent sender of the email. The category identification value uniquely identifies a category for each of the recipients of the email. The category identification value need not be unique across recipients, but is unique for any particular recipient. However in various embodiments of the present disclosure, a single recipient can have multiple unique category identifications.

A check is made in 122 to determine if the category identification field included within the metadata of the email is populated (e.g., includes a non-null value). In the case where the original sender is creating the email as an email template, the category identification field will not be populated with a value. Accordingly, in 130 the email is presented to an end-user with no category when the category identification field is not populated.

However, in some embodiments, the email system can automatically populate the category identification field with a value for a category when the email system is aware of a context within which the original sender is creating the email template. For example, if the original sender is within an email folder of the email system associated with an original sender category when the original sender creates the email template, then the email system can automatically detect the context and populate the category identification field with the original sender's category value. In other embodiments, the original sender can configure the email system with a preference, such that a default category value is always supplied by the email system when the original sender creates an email template. In still more embodiments, a particular email contact (e.g., email address or distribution email listing) can be configured within the email system to be automatically associated with one or more category identifications values and be supplied by the email system as a default when an email is directed to the particular email contact.

A category identification value can be assigned to the email in a variety of ways. For example, an end-user can access through the email system a list of available categories and select a category assignment. In these instances, a category identification value associated with the end-user selected category can be automatically populated to the category identification field on behalf of the end-user. Alternatively, the end-user can be presented with an input field to manually provide a category identification value or to manually provided a descriptive text associated with a category, which is then automatically translated by the email system to a category identification value.

The first time a recipient receives the email, the category identification field may not be populated with a value for the recipient. Alternatively, the category identification field is a global category and is populated with a value that is meaningful to all recipients and the original sender. Moreover, in some instances, the category identification field is populated but is unusable by the recipient since the value that is populated in the category identification is relevant only to the sender of the email. In this way and in some instances, multiple values can be assigned to the category identification field such that each value remains entirely unique to the original sender and to each of the recipients throughout all communications of the email between the original sender and each of the recipients. Furthermore, as previously presented and in some embodiments, a single sender or recipient of the email can have multiple unique values assigned to the category identification field and associated with multiple assigned categories.

If the email was received with a populated value for the category identification field of the email, then in 140 the value is used by the email system to acquire descriptive information associated with the value, and the email is presented with the descriptive information to the end-user within the email system. For example, a summary listing associated with the received email can include a distinctive icon recognized by the end-user as being associated with a particular category of the end-user, the summary listing can be presented with a specific color recognized by the end-user as being associated with a particular category of the end-user, or the descriptive information can be made visible to the end-user upon opening the email for view.

Additionally, the email system can perform automatic processing on the email based on the category identification value. For example, the email can be automatically routed to an end-user defined email folder, or an application can automatically be processed against the email. As is readily apparent to one of ordinary skill in the art, a variety of presentation techniques and automatic processing techniques can be used once the value is detected within the category identification field to present and/or process the email in a customized fashion to the end-user, so that the end-user can readily recognize the associated category with the email, and all such presentation techniques and processing techniques are intended to fall within the broad scope of the present invention.

Moreover, the value included in the category identification field can be used as a key to index into a data store accessible to the email system and correspondingly the end-user. In this way, the email system can automatically provide and present the end-user with a variety of related electronic information associated with the category value. For example, all emails associated with the category value can be presented, related documents or links associated with the category value can be presented, and the like.

Next, in 142 the end-user can elect to resend the email or alternatively take no action on the email. When the end-user resends the email, the resend can represent a reply or a forward operation performed against the email. In the case where an original sender is initially creating the email, the original-sender may elect to cancel the email before sending it. And, if the original sender does send the email than the check in 142 is true, even though 142 is depicted in FIG. 1 as a resend check. If an original sender cancels before sending the email or a subsequent recipient of the email takes no further action on the email then processing is complete in 150.

In 160, when a subsequent recipient of the email receives the email for the first time and elects to resend the email in 142, the email can be assigned a new category identification value by the subsequent receiver that will uniquely identify the email to the subsequent recipient of the email when the email is subsequently received in 110. Correspondingly, in 170, a new category identification value is received if a subsequent receiver desires to assign a category identification value and is receiving the email for a first time. Alternatively, an original sender or a subsequent receiver of the email may desire to change category identification values, and in these cases 170 can be used to accommodate that desire.

If, however, no new or initial category identification value is needed in 160, then the category identification field, a sender category identification field, and a receiver category identification field are adjusted in the email before it is sent or resent, as the case may be, to recipients in 190. The sender category identification field includes a category identification value unique to the sender of the email; the receiver category identification field includes a value that is unique to the receiver of the email. The sender category identification field and the receiver category identification can also be included within the metadata of the email. It is, however, readily apparent to one of ordinary skill in the art that the category identification field, in some embodiments, is not needed at all, since the receiver category identification field can be used by the email system to process category identification values by recipients, without the need for a temporary category identification field at all. Correspondingly, in some embodiments, the receiver category identification field doubles as the category identification field for recipients of the email.

When a recipient or receiver receives the email on a subsequent iteration of the email being transferred in 110, the value included within the receiver category identification field is automatically copied by the email system as a populated value for the category identification field of the email. And, the category value included within the sender category identification field is moved to the receiver category identification field. In this way, each recipient of the email views and maintains their own category values independent of all the other recipients of the email.

The sender and receiver category identification fields, in some embodiments, can be implemented as lists or other data structures such that multiple receivers of a single email can view their assigned category values. The data structure can include the email address of each of the multiple recipients such that when a particular recipient subsequently receives the email the list is inspected based on the particular recipient's email address to acquire the particular recipient's category value which is automatically moved to the category identification field of the email.

As is now apparent to one of ordinary skill in the art, classifications can be assigned for a single email such that each recipient of the email views their own customized classifications or globally assigned classifications, and these classifications remain consistent within the email as it is transferred multiple times throughout the email system (e.g., multiple reply or forward operations). This permits end-users to customize email classifications according to their own individual preferences without impacting the customizations of other end-users consuming the email. And alternatively, this permits end-users with the ability to use global classifications for all recipients and senders of the email.

Figure 2:
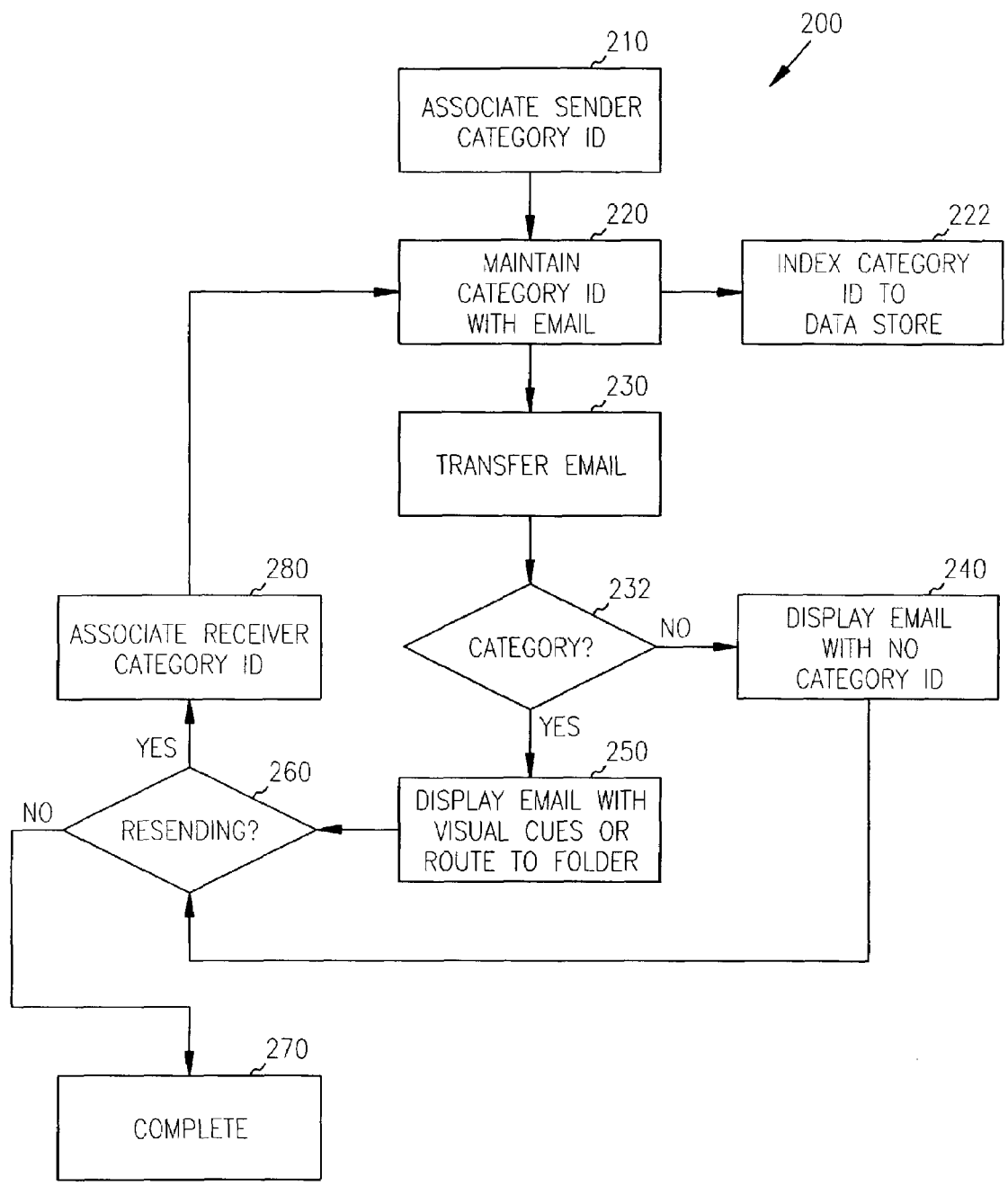
FIG. 2 is a flowchart representing another method for assigning categories to an email, according to the teachings of the present invention.

FIG. 2 illustrates a flowchart representing another method 200 for assigning categories to an email, according to the teachings of the present invention. Initially, an original sender of the email constructs the email in an email system. In one embodiment, the email system detects a context within which the original sender constructs the email and assigns a sender category identification to the email. In this way, the original sender indirectly assigns the sender category identification to the email based on the processing context of the original sender within the email system. For example, the original sender can be within an email folder of the email system that is associated with the sender category identification and the email system automatically detects this context and assigns the sender category identification to the email. In other embodiments, various tools and data stores available and integrated with the email system allow the original sender to assign the sender category identification to the email. For example, a specific email contact or email distribution list can be associated with default category identifications. In more embodiments, the original sender configures the email system to automatically provide a default sender category identification for any constructed email, which the original sender can override with different sender category identifications, if desired.

In 210, the sender category identification is associated with the email as it is indirectly or directly assigned by the original sender. Next, the sender category identification is maintained with the email in 220. In some embodiments, the sender category identification can be indexed and stored in a data store accessible to the original sender and the original sender's email system. The data store can be indexed based on the sender category identification and provide links to associate the sender category identification with a variety of additional electronic data, such as electronic documents, other electronic emails, electronic contact data, electronic applications, electronic hypertext links, and the like.

The sender category identification is maintained with the email as the email is transferred between the original sender and an original receiver in 230. The original sender has access to the sender category identification with the email when the email is transferred back to the original sender from the original receiver. Although, the email system can recognize any subsequent displayed category identification as something other than the sender category identification, as far as the original sender is concerned the sender category is always available and provided by the email system each time the email is received back by the original sender. In other words, the email system may move the sender category identification to another destination field within the email for purposes of processing the email, but this action is transparent to the original sender since all the original sender sees is the sender category identification.

For example, in one embodiment, the sender category identification is carried as metadata with the email. The email can include a variety of other data values and fields such as a receiver category identification and a general category identification. The email system automatically adjusts and moves the receiver category identification to the general category identification when a recipient receives the email from a sender. Moreover, when the recipient replies to the email the sender category identification is moved to the receiver category identification, and any recipient category identification is placed in the sender category identification. In this way, the general category identification represents each recipient's originally assigned sender category identification. Although, the receiver category identification, in some embodiments, can function as the general category identification, and in these embodiments, no general category identification is required.

In 232, when the email is received the category identification is examined; if no category identification is present then in 240 the email is displayed to the recipient with no category identification. However, if a category identification is present in the received email, then the category identification is used by the email system to display the email or process the email in 250 for the recipient of the email. In one embodiment, the category identification can be used to display a visual cue to the recipient or original sender, as the case may be. The visual cue can identify the category identification associated with the email and can be represented as an icon, a descriptive text string, a unique color, and the like. Moreover, the category identification can be used to process the email, such as automatically moving the email to a email folder associated with the category identification, executing an application against the email, and the like.

In one embodiment, in addition to the original sender having a unique category identification consistently available with iterations of the email being transferred back to the original sender, one or more original receivers can also have unique category identifications which they assign and use with the same email as they receive the email back from original sender or from other original receivers. For example, if the original receiver of the email takes some action on the received email from the original sender, such as forwarding the email back to the original sender or replying back to the original sender, then this action is detected in 260. If the original receiver takes no action, then in 270 processing of the email is complete. If action is taken, then in 280 the original receiver is permitted to assign and associate a receiver category identification, which is then maintained with the email in 220 and managed by the email system as discussed above, such that whenever the original receiver receives the email back on a second iteration, the category identification of the email will be the original receiver's assigned receiver category identification.

In some embodiments of method 200, the original receiver can include a distribution list of email addresses associated with a plurality of original receivers or a manually constructed list of email addresses. In this way, the interaction of method 200 between an original sender and multiple original receivers is permissible. Moreover, the original receivers of the email can become subsequent senders of the email if they reply or forward the email. In this way, the original email can be associated with multiple senders and receivers.

Additionally, although the example email discussed with FIG. 2 includes one of more category identification fields included with the email, it is readily apparent to one of ordinary skill in the art that this need not always be the case. For example, a centrally located data store associated with the email systems of all the end-users communicating with the email can be used in combination with the email and the email addresses of the end-users. In this way, each end-user assigns category identifications for the email using the unique email message number and their own email address, which can be automatically acquired by the email system from the email. Alternatively, each end-user can assign globally accessible category identifications that are visible to the remaining end-users. Of course a variety of other configurations and techniques can be used to ensure that a single email being transferred multiple times throughout an email system is operable to uniquely and consistently maintain customized category identifications for each of the recipients of the email or global categories for all the recipients, and all such configurations and techniques are intended to fall within the broad scope of the present invention.

Figure 3:
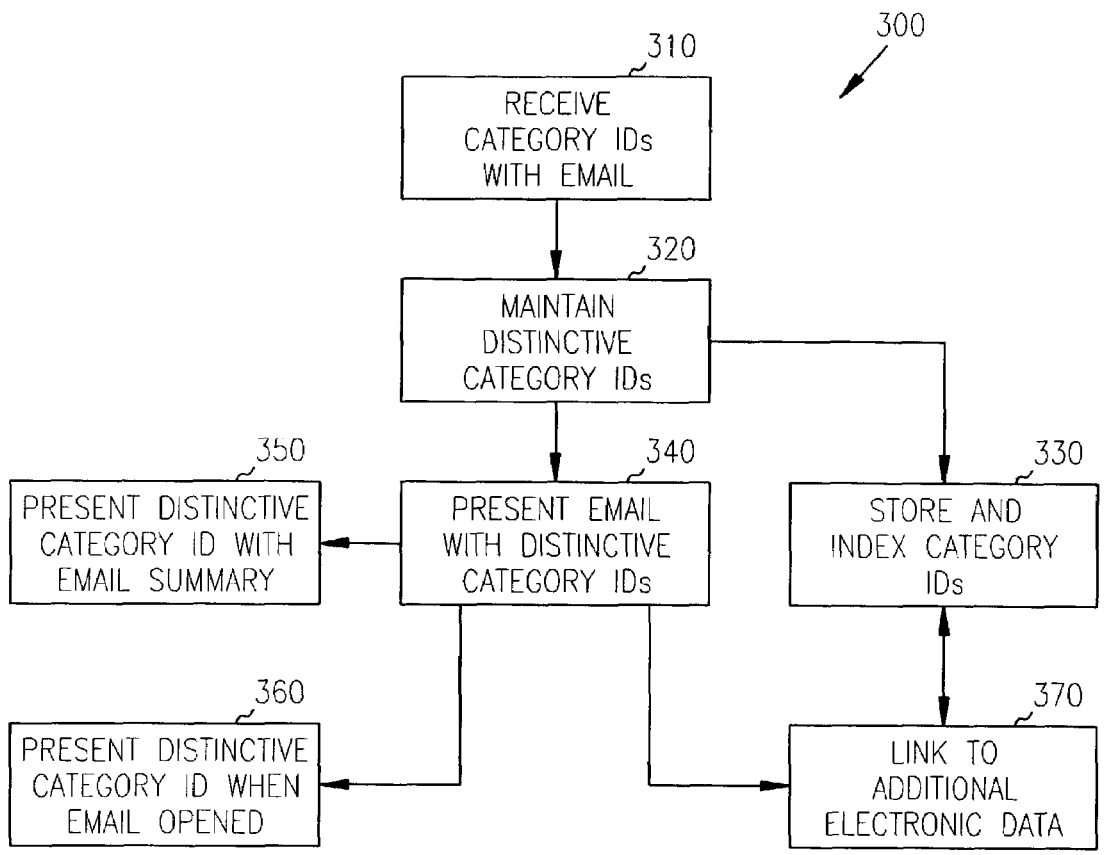
FIG. 3 is a flowchart representing a yet another method for assigning categories to an email, according to the teachings of the present invention.

FIG. 3 illustrates a flowchart representing a yet another method 300 for assigning categories to an email, according to the teachings of the present invention. In 310, category identifications are received from recipients and senders of the email. Each of the category identifications is unique to each of the recipients and each of the senders. In some embodiments, a single recipient can have multiple unique category identifications. Moreover, depending upon the action being taken on the email (e.g., reply or forward), a recipient of the email can become a sender of the email when replying or forwarding the received email. Likewise, a sender of the email can become a recipient of the email when receiving the email back from a new sender. Therefore, the role or the recipient and the sender can change as the email is being transferred through the email system.

Next, in 320 a distinctive category identification selected included within the category identifications is maintained for each unique recipient and sender. A recipient or sender is unique based on their email address, in this way regardless of the changing role of an email address; there are distinctive category identifications for a single email address. Therefore, and as previously discussed, end-user assigned category identifications and each individual end-user remains uniquely associated with their own distinctive category identification.

In some embodiments, the distinctive category identification is stored and indexed in a separate data store in 330. Each unique end-user is associated with one of the separate data stores. In some embodiments, the data store is a central storage area and can include files tagged using a data tagging format, such as and by way of example only Extensible Markup Language (XML), Hypertext Markup Language (HTML), Portable Document Format (PDF), any ad-hoc consistent data format, an email system supported data format, and others. Of course as one of ordinary skill in the art readily appreciates the data store can also be fielded and presented as one or more databases that are relational or Objected Oriented (OO). Each data store can provide a link to the distinctive category identification for a single end-user to a plurality of additional electronic data in 370. In this way, the data stores are accessible to the email systems of each end-user and correspondingly the end-user.

If the email is received by a sender or receiver of the email, after the email had been previously associated with a distinctive category identification assigned by the sender or receiver, then the email system automatically detects the association of the distinctive category identification in the email, and in 340 the email is presented to the sender or the receiver with the distinctive category identification. The distinctive category identification can also be used automatically by the email system to perform one or more processes against the email.

In some embodiments, the distinctive category identification is presented with a summary listing of the email in the sender or receiver's email inbox. For example, a distinctive icon can be horizontally depicted with the summary listing of the email to provide rapid identification of the distinctive category identification to the sender or the receiver in 350.

Alternatively, some distinctive or customized presentation can be inserted or superimposed upon the email itself such that when the sender or receiver opens the email for viewing in 360, the inserted (e.g., embedded) or superimposed (e.g., logically associated and depicted with the email) presentation is visible to the sender or receiver. However, it is readily apparent to one of ordinary skill in the art that the presentation of the distinctive category identification can be achieved in a variety of ways and need not exclusively be a visual presentation, since distinctive audio presentation can be used as well. Moreover, in some embodiments of the presentation, the senders and receivers can configure the presentation to their own individual preferences using various tools provided with the email system.

Additionally, the email can be automatically processed by the email system of a sender and receiver based on the detected distinctive category identification. For example, the email can be automatically routed to a sender or receiver defined email folder. Further, the email body (e.g., text of the email) or any email attachments associated with the email can be routed for processing by any sender or receiver defined software applications (e.g., automatically performing a query on the email against a database using the email body as a search string, and others).

Figure 4:
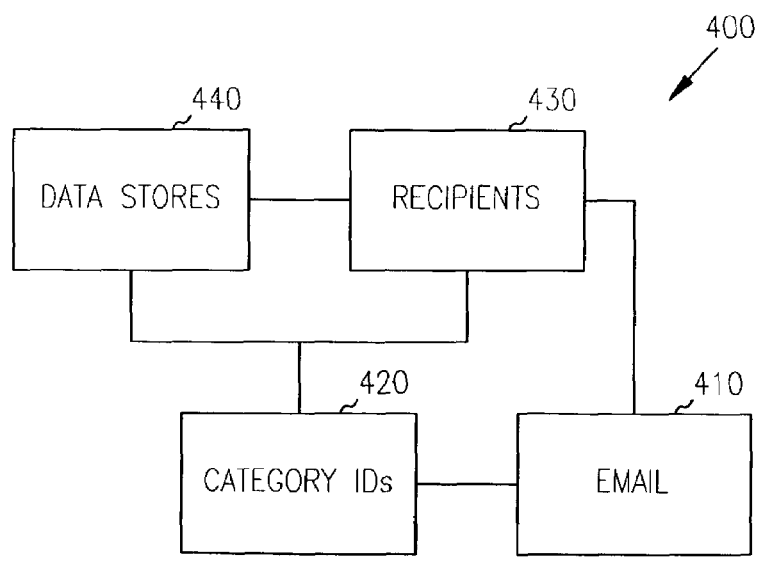
FIG. 4 is a block diagram of an email category assigning system, according to the teachings of the present invention.

FIG. 4 illustrates a block diagram of one email category assigning system, according to the teachings of the present invention. The email category assigning system includes an email 410 and a plurality of category identification fields 420. The email 410 is associated with the plurality of category identifications 420, such that each category identification 420 is uniquely associated with a different recipient 430 of the email 410, when a recipient 430 previously assigned a category identification 420 to the email 410. However, in some embodiments, a single recipient 430 can have a plurality of unique category identifications 420, if desired. Furthermore, in more embodiments, a single category identification 420 can be globally accessible to one or more of the recipients 430.

In some embodiments, the category identifications 420 are carried in the metadata of the email 410, and adjusted by an email system depending on the identity of the recipient 430 and a sender of the email 410. In other embodiments, the category identifications 420 need not be carried with the metadata of the email 410, since a centrally accessible data store can be used in combination with the email addresses of the recipients 430 to resolve distinctive category identification 420.

Moreover in some embodiments, each recipient 430 can use in combination with their own email system a data store 440, in order to acquire distinctive and recipient 430 defined information with respect to each recipient's 430 previously assigned category identification 420 for the email 410. The separate data stores 440 are accessible to each of the recipients 430 and each recipient's 430 email system and can be used to acquire related electronic data associated with the recipient's 430 distinctive category identification 420.

In one embodiment, the category identifications 420 are defined by each of the recipient's 430 based on preferences of the recipients 430. In more embodiments, the category identifications 420 can be predetermined and provided by the email system to each of the recipients 430 for assignment to the email 410. Furthermore, a combination of recipient 430 defined category identifications 420 and email system provided category identifications 420 can be provided with the tenets of the present disclosure.

When a recipient 430 receives the email 410, the distinctive category identification 420 is visible to the recipient 430. Visibility can be achieved using a variety of techniques, such as by indexing the distinctive category identification 420 to secondary data stores 440 or files to acquire descriptive information (e.g., text, audio, images, video) desired or previously configured by the recipient 430. Moreover, the recipient can customize the manner in which the visibility of the distinctive category identification 420 is communicated to the recipient 430. For example, the visibility of the distinctive category identification 420 can be presented in a summary listing associated with the email 410 or alternatively the visibility of the distinctive category identification 420 can be embedded in a recipient's 430 version of the email 410, such as in the email's 410 subject text, or in the email's 410 body.

And, as one of ordinary skill in the art readily appreciates, the email's 410 original data need not be altered to achieve this customized presentation to the recipient 430 in creating a version of the email 410 for the recipient 430. In this way, the email system of the recipient 430 can use the distinctive category identification 420 to automatically configure the email 410 when received by the recipient 430 in the recipient's 430 email inbox.

Also, the distinctive category identification 420 can be used by an email system of the recipient 430 to automatically execute one or more processing rules associated with the recipient's 430 received distinctive category identification 420. The processing rules can be embodied as a macro programming language provided by the email system that can perform a variety of recipient 430 defined logic. In some cases, the processing rules permit the email 410 to be routed to a recipient 430 defined email folder, in other cases the processing rules can perform more complex logic permitting the contents of the email 410 to be inspected and a number of additional software applications processed based on the inspection.

Figure 5:
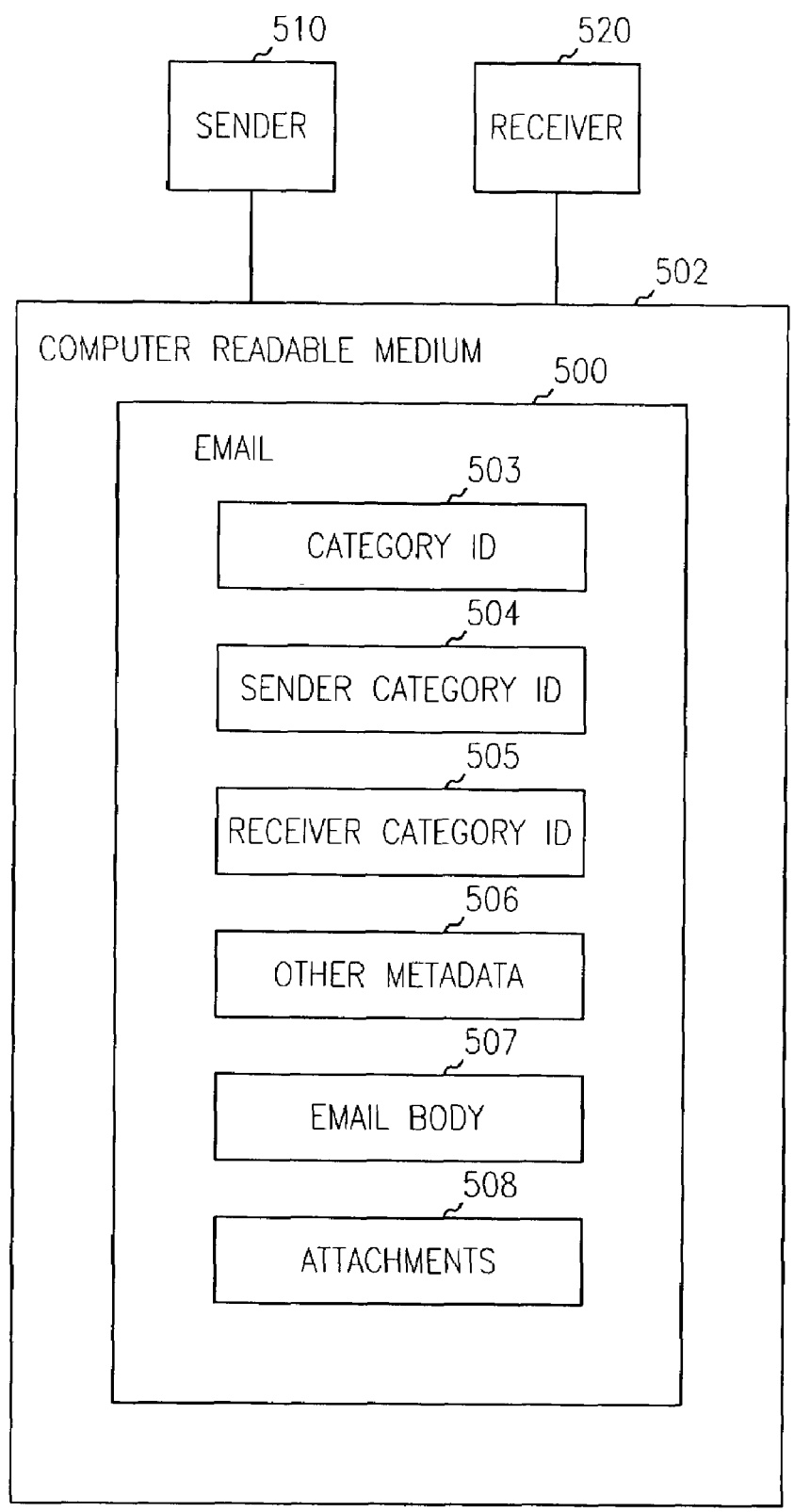
FIG. 5 is a block diagram of an email data structure, according to the teachings of the present invention.

FIG. 5 illustrates a block diagram of one email data structure 500, according to the teachings of the present invention. The email data structure 500 resides on one or more computer readable media 502 and is accessible to an email system and correspondingly to an end-user of the email system. Moreover, as one of ordinary skill in the art appreciates, the email data structure 500 need not be contiguously stored in the computer readable medium 502, since the processing logic of the email system can logically assemble the email data structure 500 from a plurality of non-contiguous storage or memory locations.

The email data structure 500 includes a sender category identification field 504, a receiver category identification field 505, and optionally a category identification field 503. The email data structure 500 can also include other metadata 506, an email body 507, and attachment data 508, if appropriate. The fields (e.g., 503-505) house values for category identifications.

In some instances, the fields are operable to house the values as more complex data structures, such as lists, tables, and the like. The data structures permit the values to be organized such that each value within the data structure can be uniquely associated with a single email address. In this way the data structure can be embedded within the fields (e.g., 503-505), to uniquely provide a single value (or list of unique values) for a category identification(s) to a single receiver 520 associated with a unique email address. This is particular useful when the email data structure 500 is being transferred to a distribution list of receivers 520 (e.g., or multiple manually identified receivers 520), associated with a plurality of senders 510 and receivers 520 of the email data structure 500. Moreover, in some embodiments, the category identification can identify a globally accessible category that is meaningful and used by all receivers 520 of the email data structure 500.

When a sender 510 assigns a sender category identification value to the email data structure 500, the sender category identification value is placed in the sender category identification field 504, and any previous sender category identification value which was included in the sender category identification field 504 prior to placing the newly assigned sender category identification value in the sender category identification field 504 is moved to the category identification field 503 and the receiver category identification field 505. In this way, a receiver 520 will receive the email data structure 500 with a value contained in the category identification field 503 that represents the receiver's 520 previously assigned category for the email data structure 500. Of course as is readily apparent to one of ordinary skill in the art, the category identification field 503 need not be required at all, since the receiver category identification field 505 can be used to perform the same function of the category identification field 503 depicted in FIG. 5. Next, the receiver's 520 email system detects the value included within the category identification field 503, or the receiver category identification field 505, as the case may be, and performs customized presentation or processing on the email data structure 500 on behalf of the receiver 520.

Therefore, the email data structure 500 can be automatically configured by the email system for presentation to the receiver 520. Moreover, the value included within the category identification field 503 or the receiver category identification field 505 can be used to automatically perform processing on the email data structure 500, such as routing the email data structure 500 to one or more receiver 520 defined email folders. And, in some instances, the value included within the category identification field 503 can be linked to a data store accessible to the receiver 520, where the data store includes additional electronic data associated with the value.

One of ordinary skill in the art now appreciates that a single email can be assigned multiple categories, where each category is customized to one of a plurality of recipients of the email. Moreover, the association of the customized categories with the email is maintained as the email is transferred back and forth to the recipients. And, the customized categories are presented to each of the recipients in a customized fashion that is meaningful to each of the recipients. The teachings of the present invention are particular well suited for the improving the customized filtering and processing techniques desired by recipients of an email that is transferred as multiple iterations through an email system.

Furthermore, although the present disclosure was discussed such that a single recipient was capable of viewing and processing on their own individually assigned categories to an email, it is readily apparent that the present disclosure need not be so limited, since each recipient's categories can in some instances be disclosed to all of the remaining recipients. The categories associations are maintained with the email in the present disclosure; so exposing this information to each of the recipients participating in communications with the email is readily achieved. Moreover, in some embodiments, any schema associated with a particular recipient's category hierarchy and processing needs can also be associated and maintained with the email, such that parsing tools can be implemented by each of the recipients to automatically associate and translate from one recipient's category hierarchy to another recipient's category hierarchy. This could be achieved for example by using an XML schema, where the recipients develop Extensible Style Sheet Transformation (XSLT) applications to perform the needed translations in an automated fashion. This would also facilitate the automatic integration and translation of one recipient's email configuration to another recipient's email configuration.

Additionally, in various embodiments of the present invention, category identification values need not be carried with the email when a particular sender or receiver does not assign a category identification value to a previously received instance of the email. For example, if sender A assigns no category identification value to an email and transmits the email to receiver B, where receiver B transmits the email only to receiver C, then there is no need to carry original sender A's category identification information. This can decrease the memory requirements needed for the email as it is transferred throughout the various email systems.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A method for assigning electronic mail (email) categories, comprising:
    associating a sender category identification with the email as assigned by an original sender of the email, wherein the sender category identification is unique with respect to the original sender; and
    maintaining the sender category identification as the email is transferred between the original sender and an original receiver, and wherein the original sender has access to the sender category identification when the email is transferred back to the original sender from the original receiver, and wherein the sender category identification is assigned to a different field of the email which is different from a subject field, and wherein the different field is just modifiable by the original sender, and wherein the sender category identification is viewable by and maintained by the original sender independent of receiver categories that the original receiver may subsequently assign to the email and independent of any subsequent categories that subsequent senders may assign to the email.

2. The method of claim 1, further comprising:
    associating a receiver category identification with the email as assigned by the original receiver of the email; and
    maintaining the receiver category identification with the email as the email is transferred between the original sender and the original receiver, and wherein the original receiver has access to the receiver category identification when the email is transferred back to the original receiver from the original sender.

3. The method of claim 1 further comprising, displaying to the original sender a visual cue as the email is transferred back to the original sender, wherein the visual cue identifies the sender category identification associated with the email.

4. The method of claim 3 wherein in displaying to the original sender the visual cue, the visual cue includes at least one of an icon, a descriptive text string, and a unique color associated with the email.

5. The method of claim 1 further comprising, automatically moving the email as it is transferred back to the original sender, to an email folder associated with the sender category identification.

6. The method of claim 1, wherein in maintaining the sender category identification, the sender category identification is indexed in a data store accessible to the original sender.

7. The method of claim 1, wherein in maintaining the sender category identification, the original receiver is a distribution list comprising multiple receivers.

8. A method for assigning electronic mail (email) categories, comprising:
    receiving category identifications from recipients and senders of the email;
    maintaining a distinctive category identification from the category identifications for each recipient and sender included within the recipients and senders, wherein each category identification in the category identifications is unique to a particular one of the recipients or one of the senders and is viewable by that particular recipient or sender; and presenting the distinctive category identification with the email as the email is received by a recipient associated with the distinctive category identification and the distinctive category is unique to the recipient, and wherein the category identifications are associated with different fields of the email that are different from a subject field of the email, and wherein the category identifications are just modifiable and viewable by a party that created them.

9. The method of claim 8, wherein in receiving the category identifications, the senders of the email become the recipients of the email when the email is transferred back to the senders.

10. The method of claim 8, wherein in receiving the category identifications, the category identifications are embedded in the email.

11. The method of claim 8 further comprising, storing and indexing each distinctive category identification within a separate data store, wherein each recipient and sender associated with the distinctive category identification has access to its own separate data store in order to index on the distinctive category identification.

12. The method of claim 11, wherein in storing and indexing each distinctive category identification, the separate data stores includes links to additional electronic data associated with the distinctive category identification.

13. The method of claim 8, wherein in presenting the distinctive category identification, the distinctive category identification is presented with a summary listing associated with the email.

14. The method of claim 8, wherein in presenting the distinctive category identification, the distinctive category identification is presented when the email is opened for viewing.

15. An electronic mail (email) category assigning system, comprising:
   an email;
   a plurality of category identifications; and
   wherein the email is associated with the plurality of category identifications, each category identification is uniquely associated with a different recipient of the email, if an assigned category identification was previously designated by one of the recipients, and wherein the plurality of category identifications are associated with one or more different fields of the email that are different from a subject field of the email, and wherein each category identification is just modifiable by a party that created it, and wherein each category identification is just viewable by the party that created it and different parties to the email have their own unique selection from the category identifications.

16. The email category assigning system of claim 15, wherein each category identification is visible with the email by the recipient uniquely assigned to the category identification.

17. The email category assigning system of claim 16, wherein each category identification is linked from the email to a separate data store, wherein each separate data store is accessible by the recipient uniquely assigned to the category identification.

18. The email category assigning system of claim 15, wherein each category identification is used to automatically configure the email when received by the recipient uniquely assigned to the category identification.

19. The email category assigning system of claim 18, wherein processing rules associated with the automatic configuring of the email are defined by the recipient uniquely assigned to the category identification.

20. The email category assigning system of claim 15, wherein the plurality of category identifications are defined and assigned to the email by each of the recipients.

21. An electronic mail (email) data structure residing on a computer readable medium associated with categories, comprising:
   a sender category identification field implemented within the computer readable medium;
   a receiver category identification field implemented within the computer readable medium; and
   wherein when a sender assigns a sender category identification value to the email, the sender category identification value is placed in the sender category identification field and any previous receiver category identification value contained in the sender category identification field is moved to the receiver category identification field before the email is sent by the sender to a receiver, the sender category identification field is unique to just the sender and viewable by just the sender and receiver category identification field is unique to just the receiver and viewable by just the receiver, and wherein the sender and receiver category identification fields are associated with one or more different fields of the email that are different from a subject field of the email, and wherein the sender category identification value is just modifiable by the sender and the receiver category identification value is just modifiable by the receiver.

22. The email data structure of claim 21, wherein the sender category identification field and the receiver category identification field include multiple category identifications values associated with at least one of distribution lists of multiple senders and multiple receivers of the email.

23. The email data structure of claim 21, wherein a value associated with the receiver category identification field is presented with the email when received by the receiver.

24. The email data structure of claim 23, wherein the value is linked to a data store accessible to the receiver, and the data store includes additional electronic data associated with the value.

25. The email data structure of claim 23, wherein the value is used to configure the presentation of the email to the receiver.

26. The email data structure of claim 23, wherein the value is used to route the email to an email folder of the receiver.

* * * * *